(12) United States Patent
Muller et al.

(10) Patent No.: US 9,240,252 B2
(45) Date of Patent: Jan. 19, 2016

(54) ASSEMBLY AND METHOD FOR INJECTING WATER CONTAINING A NEURTON-ABSORBING ELEMENT TO COOL A NUCLEAR REACTOR CORE IN A CRISIS SITUATION

(71) Applicant: AREVA NP, Courbevoie (FR)

(72) Inventors: Thierry Muller, St. Helene (FR); Emilie Maud Guillaume, Vienne (FR); Jean-Paul Bombail, Lyons (FR); Michael Guillodo, Broye (FR)

(73) Assignee: AREVA NP, Courbevoie (FR)

( * ) Notice: Subject to any disclaimer, the term of this patent is extended or adjusted under 35 U.S.C. 154(b) by 425 days.

(21) Appl. No.: 13/689,988

(22) Filed: Nov. 30, 2012

(65) Prior Publication Data
US 2013/0170599 A1 Jul. 4, 2013

(30) Foreign Application Priority Data

Nov. 30, 2011 (FR) ...................................... 11 60940

(51) Int. Cl.
*G21C 9/033* (2006.01)
*G21C 15/18* (2006.01)
*G21D 3/04* (2006.01)

(52) U.S. Cl.
CPC .............. *G21C 9/033* (2013.01); *G21C 15/182* (2013.01); *G21D 3/04* (2013.01); *Y02E 30/40* (2013.01)

(58) Field of Classification Search
CPC .......... G21C 9/033; G21C 15/182; G21D 3/04
USPC .................................................. 376/282, 909
See application file for complete search history.

(56) References Cited

U.S. PATENT DOCUMENTS

| | | | | |
|---|---|---|---|---|
| 4,225,390 A | * | 9/1980 | Brown et al. | 376/328 |
| 4,595,555 A | * | 6/1986 | Orii | 376/282 |
| 2010/0239062 A1 | * | 9/2010 | Yeon et al. | 376/282 |
| 2010/0272226 A1 | * | 10/2010 | Kojima et al. | 376/282 |
| 2013/0121454 A1 | * | 5/2013 | Newton et al. | 376/299 |

FOREIGN PATENT DOCUMENTS

| | | |
|---|---|---|
| GB | 892 290 A | 3/1962 |
| JP | 2011 052970 A | 3/2011 |

OTHER PUBLICATIONS

Hodge et al, "Identification and Assessment of BWR In-Vessel Severe Accident Mitigation Strategies". Oak Ridge National Laboratory, NUREG/CR-5869, ORNL/TM-12080, Oct. 1992.*

(Continued)

*Primary Examiner* — Jack W Keith
*Assistant Examiner* — Daniel Wasil
(74) *Attorney, Agent, or Firm* — Davidson, Davidson & Kappel, LLC

(57) ABSTRACT

An assembly is provided including a mobile structure including a main pipe equipped with a first end intended to be connected to a water supply and a second end intended to be connected to a circuit connected to the primary circuit of the reactor, and including between these two ends in the direction of circulation of the water, a pump, a water heating device, an injector for continuously injecting the powdered neutron-absorbing element into the water of the main pipe, a first mixer for mixing and dissolving powder with water and a controller driving and controlling the flow rate of the water and the flow rate of the powder injected.

7 Claims, 1 Drawing Sheet

(56) References Cited

OTHER PUBLICATIONS

Green, "The Radiological and Environmental Impact of Nuclear Accidents—a Case Study of Japan's Fukushima Daiichi Nuclear Power Plant", University of Surrey. Sep. 2011.*

Brown et al, "Slurry and Air Do Mix: Interim Results of WFGD Absorber Slurry Aeration Studies". Babcock & Wilcox Power Generation Group, 2008.*

Nuclear and Industrial Safety Agency: "Seismic Damage Information ($29^{th}$ Release)," Mar. 16, 2011, XP55033863.

TEPCO: "Press Release (Mar. 13, 2011): Impact to TEPCO's Facilities due to Miyagiken-Oki Earthquake (as of 1:00PM)," XP002680813.

* cited by examiner

ASSEMBLY AND METHOD FOR INJECTING WATER CONTAINING A NEURTON-ABSORBING ELEMENT TO COOL A NUCLEAR REACTOR CORE IN A CRISIS SITUATION

This application claims priority to French Patent Application 11 60940, filed on Nov. 30, 2011, the entire disclosure of which is hereby incorporated by reference herein.

This disclosure concerns a device and method for injecting water containing a neutron-absorbing element to cool a nuclear reactor core in a crisis situation, e.g., in the event of a total loss of electrical power and failure of cooling systems.

BACKGROUND

Pressurised-water nuclear reactors contain a tank enclosing the nuclear reactor core and a primary circuit ensuring the circulation and cooling of the pressurised water that comes in contact with the nuclear reactor core inside the tank.

The primary circuit of the nuclear reactor includes at least one loop on which a steam generator is arranged that is linked to the tank directly by a first pipe or hot leg, ensuring the supply of pressurised water heated on contact with the fuel assemblies of the core to the primary part of the steam generator The primary part of the steam generator is also connected to the tank via a primary pump, by means of linking pipes including, in particular, a second pipe, or cold leg, of the loop of the primary circuit connected to the tank.

The pressurised cooling water of the nuclear reactor ensures, within the steam generators, the heating and vaporisation of the water supplied in order to produce vapour that drives a turbine.

The regulation of the reactivity of the nuclear reactor core, i.e., the regulation of the density of neutrons produced in the nuclear reactor core when it is operating, may be carried out, in particular, by injecting into the primary circuit, an aqueous solution containing a neutron-absorbing element such as boron 10.

For example, a solution may be used that contains boron, such as a boric acid solution that is stored in the emergency accumulators of the safety injection system or in pressurised reservoirs connected to at least one of the cold legs of the primary circuit of the nuclear reactor via an injection pipe on which means of control or regulation, such as butterfly valves, and means of injection such as one or more volumetric pumps, are arranged.

When a nuclear reactor is powered down, whether this is normal or accidental, it is necessary to evacuate the residual power from the core in order to avoid the melting of the fuel assemblies.

Additionally, a borication of the powered-down primary reactor circuit is necessary to control the reactivity of the core.

These functions must be ensured even if the electrical power supplies of the nuclear plant are unavailable.

In the event of total loss of electrical power supplies and cooling systems, it is necessary to start up, as soon as possible, a means of continuous injection of water containing a neutron-absorbing element, e.g., one containing a minimum of 2500 ppm of boron that has a natural isotope content of boron 10, and a flow rate of between 20 and 90 m3/hour. This injection of water containing a neutron-absorbing element, and in particular boron 10, must occur very quickly after the reactor is powered down; if it is delayed, the meltdown of the fuel assemblies will have begun.

If the degradation of the fuel assemblies cannot be avoided, the injection of water containing a neutron-absorbing element remains necessary in order to maintain the core in a subcritical, cooled state. The necessary flow rate changes with the residual power present in the nuclear reactor core.

Accident management scenarios foreseen to date take into account the total loss of electrical power supplies in existing cooling systems, or the total loss of the heat sink, due, e.g., to a breach of the main primary circuit.

However, these scenarios do not take into account the combination of the two.

In order to remedy such a situation, it is necessary to evacuate the residual power from the core in order to avoid the meltdown of the fuel assemblies by means of continuous injection of water containing a neutron-absorbing element consisting of boron.

One solution is to use the tarpaulins present on the site and fill them continuously, in this emergency situation, with a mixture of water and boron.

However, the difficulty is the transportation of a substantial amount of water containing boron, prepared outside of the area of the nuclear reactor, in a crisis situation.

SUMMARY OF THE INVENTION

The invention seeks to propose an assembly for injecting water containing a neutron-absorbing element allowing for the avoidance of these problems and capable of operating despite the total loss of electrical power in the nuclear reactor.

The invention thus concerns an assembly for injecting water containing a neutron-absorbing element in order to cool a nuclear reactor core in a crisis situation, characterised in that it comprises a mobile structure containing a main pipe, a first end of which is intended to be connected to a water supply, and a second end of which is intended to be connected to a circuit connected to the primary circuit of the nuclear reactor, and comprising, between the first and second ends with, in order to ensure the circulation of water:

a pump,
an injector for continuously injecting of the neutron-absorbing element in powder form into the water of the main pipe;
a mixer for mixing and dissolving the powdered form of the neutron-absorbing element in the water, and
a controller for driving and controlling of the flow rate of the water and that of the powder injected.

According to other characteristics of the invention:
the main pipe includes, between the pump and the injector, a heater for heating the water, regulated by the controller,
the assembly comprises a secondary pipe, a first end of which is intended to be connected to a water supply, and a second end of which is connected to the main pipe between the first mixing system and the second end of the main pipe,
which secondary pipe includes a pump,
the main pipe includes, between the second end of the secondary pipe and the second end of the main pipe, a second auxiliary mixer for mixing the powdered neutron-absorbing element with the water from the secondary pipe,
the first mixer is formed by a mechanical mixer and ultrasound inducers controlled by the controller,
the second mixer is formed by a mechanical mixer, and
the water flow in the main pipe is less than the flow rate of the water in the secondary pipe.

The invention further concerns a method for cooling a nuclear reactor core in a crisis situation using an assembly such as that described above, characterised in that:

the mobile structure is transported to the vicinity of the building housing the malfunctioning nuclear reactor, the first end of the main pipe is connected to a water supply and the second end of this pipe is connected to a circuit connected to the primary circuit of the reactor, the pump of the main pipe, the injector for injecting the powdered neutron-absorbing element into the water of the main pipe, and the first mixer for mixing and dissolving the powdered form of the neutron-absorbing element in the water are controlled by the controller, the primary circuit of the nuclear reactor is supplied with the water containing the neutron-absorbing element to progressively cool the nuclear reactor core, and the flow rates of the water and the powder and the first mixer are regulated by the controller.

According to other characteristics of the invention:

the water of the main pipe is heated, and the temperature of this water is regulated by the controller, the method consists of:

connecting the first end of the secondary pipe to a water supply, controlling, by means of the controller, the pump of the secondary pipe, injecting water from the secondary pipe into the main pipe between the first mixer and the second end of the main pipe, controlling, by means of the controller, the second mixer in order to provide a secondary mixture of the powder with the water, supplying the main circuit of the nuclear reactor with water containing the neutron-absorbing element, and regulating, by means of the controller, the flow rates of the water in the main and secondary pipes, the flow rate of the powder, and the first and second mixers.

BRIEF DESCRIPTION OF THE DRAWINGS

The characteristics and advantages of the invention will become apparent from the following description, provided by way of example and by reference to the attached drawings, in which.

DETAILED DESCRIPTION

Figure 1:
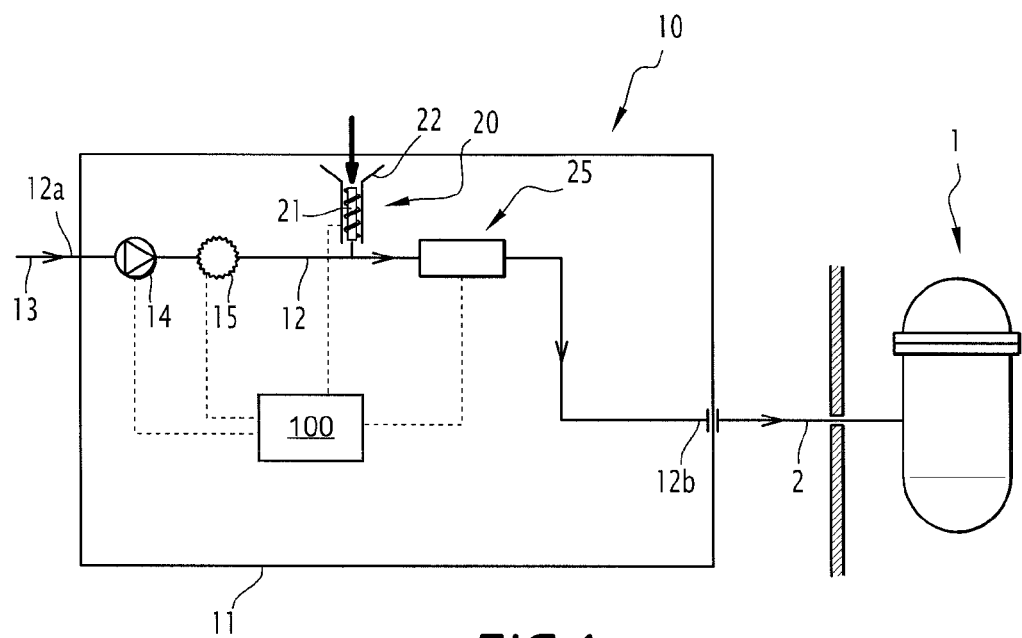
FIG. 1 is a schematic representation of a first embodiment of an assembly for injecting water containing a neutron-absorbing element according to the invention.

In the drawings, two embodiments of an assembly for injecting water containing a neutron-absorbing element, e.g., boron 10, to cool a nuclear reactor in a crisis situation, i.e., in the event of a total loss of electrical power and means of cooling, have been schematically represented.

A soluble form of boron, e.g., boric acid or borates, is used.

In these drawings, the nuclear reactor core is shown schematically and indicated by reference no. 1, and the cooling assembly shown in larger scale is indicated by reference no. 10.

The cooling assembly 10 comprises a compact mobile structure 11, having limited weight and dimensions and compatible with being transported by a land or maritime vehicle, or by helicopter.

This structure 11 consists, e.g., of a chassis containing all of the elements allowing for the cooling of the nuclear reactor core by means of injection of fresh or salt water containing a neutron-absorbing element, e.g., boron 10.

According to the first embodiment shown in FIG. 1, the mobile structure 11 has a main pipe 12, a first end 12a of which is intended to be connected, e.g., by a known-art connector, to a fresh or salt water supply 13. This main pipe 12 includes a second end 12b intended to be connected to a circuit connected to the primary circuit of the nuclear reactor by means of an existing tap 2 that allows for the injection of the water containing the neutron-absorbing element into this primary circuit.

To this end, the main pipe 12 includes between the first 12a and second end 12b, in the direction of circulation of water, a pump 14 and a device 15 for heating the water circulating within the main pipe 12. This heating device 15 is formed, e.g., by a classic electrical ring heating system or by any other appropriate, known-art heating system.

The main pipe 12 also includes, downstream of the heating device 15, an injector 20 for continuously injecting into the water of the powdered neutron-absorbing element and a first mixer 25 for mixing and dissolving this powder in the water.

Injection 20 is formed, e.g., by a worm conveyor 21, the entrance of which is connected to a hopper 22 into which the powdered neutron-absorbing element is continuously discharged, e.g., a known-art desacking machine, not shown.

The first mixer 25 is formed by a mechanical mixer allowing for mixing of the water and the powdered neutron-absorbing element, and this mechanical brewing is reinforced by ultrasound inducers, not shown, increasing the efficacy of the dissolution of the powder in the water.

The various elements, i.e., the operation or stopping of the pump 14, the heating device 15, the flow rates of the water and the powdered neutron-absorbing element, and the first mixer 25 are regulated by a controller 100.

Thus, the flow rates of the water and the powder are regulated, and the water is heated, so as to avoid the crystallisation of the powdered neutron-absorbing element.

Figure 2:
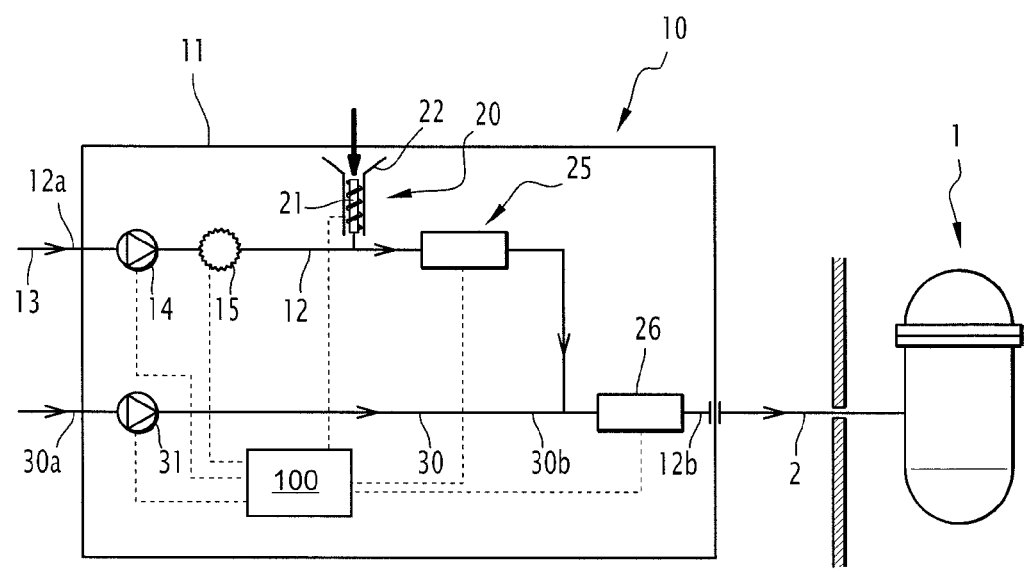
FIG. 2 is a schematic representation of a second embodiment of an assembly for injecting water containing a neutron-absorbing element according to the invention.

In FIG. 2, a second embodiment is shown in which the common elements with the preceding embodiment have been indicated by the same reference numbers.

The injection assembly 10 according to the second embodiment of FIG. 2 also comprises a mobile structure 11 containing the main pipe 12 with the pump 14, the heating device 15, the injector 20 of the powdered neutron-absorbing element into the water in the main pipe, and the first system 25 for mixing and dissolving this powder in the water of the main pipe 12.

In this second embodiment, the structure 11 also includes a secondary pipe 30, having a first end 30a intended for connection by means of a known-art connector to a fresh or saltwater supply. This secondary pipe 30 also includes a second end 30b connected to the main pipe 12 between the first mixing and dissolution system 25 and the second end 12b of the main pipe 12. The secondary pipe 30 also includes a pump 31 controlled by the controller 100.

In this embodiment shown in FIG. 2, the main pipe 12 includes, between the second end 30b of the secondary pipe 30 and the second end 12b of the main pipe 12, a second auxiliary system 26 for mixing the powdered neutron-absorbing element and the water from the secondary pipe 30.

This second mixing system 26 is formed by a mechanical mixer also controlled by the controller 100.

Generally, the flow rate of the water of the main pipe 12 is lower than the flow rate in the secondary pipe 30. By way of example, the flow rate in the main pipe 12 is between 0.5 and 5 l/s, and the flow rate of the water in the secondary pipe is between 10 and 50 l/s. The water in the secondary pipe 30 is at room temperature.

Referring now to the embodiment shown in FIG. 2, the operation of the injection assembly 10 will be described.

In the case of a nuclear reactor in a crisis situation that has lost its electrical power and cooling system, the structure 11 is brought into the vicinity of the building housing the reactor by an appropriate means of transportation.

When the structure 11 is in place, it is connected to an external electrical power source, and the first ends 12a and 30a, respectively of the main pipe 12 and the secondary pipe 30, are connected to a fresh water or saltwater supply.

Likewise, the second end 12b of the main pipe 12 is connected to a circuit opening into the primary circuit of the nuclear reactor.

Then, an operator actuates the controller 100 so as to start the pumps 14 and 31, the heating device 15, the injector 20 of the powdered neutron-absorbing element into the water of the main pipe 12, as well as the first mixer 25 for mixing and dissolving the powder, and the second auxiliary mixer 26 for mixing the powder.

The powder is continuously emptied into the hopper 22, and the worm conveyor 21 continuously injects the powder into the preheated water inside the main pipe 12.

The mechanical brewing carried out by the first mixer 25 allows for instant mixing of the water and the powder, and the ultrasound inducers of the first mixer 25 reinforce the efficacy of the dissolution of the powdered neutron-absorbing element in the water. The online heating device 15 allows for increased dissolution kinetics of the powdered neutron-absorbing element and prevents its crystallisation By way of example, the flow rate of the water in the main pipe 12 ranges between 0.5 and 5 l/s.

The water containing the dissolved neutron-absorbing element is injected into the second mixer 26, which ensures the dilution of the water containing the neutron-absorbing element in a water flow at room temperature originating from the secondary pipe 30 at a higher flow rate.

By way of example, the flow rate of the water in the secondary pipe 30 ranges between 10 and 50 l/s.

At the second end 12b of the main pipe 12, the water and the neutron-absorbing element dissolved therein are injected into the primary circuit of the nuclear reactor in a crisis situation both to prevent the meltdown of the core by cooling it using the water containing sufficient neutron-absorbing elements at a sufficient flow rate, and of slowing down or stopping the meltdown of the core in the event that this injection system is put into operation too late to prevent a serious accident.

In the event of a structure 11 including only the main pipe 12, as shown in FIG. 1, the water containing the dissolved neutron-absorbing element directly injected into the primary circuit of the nuclear reactor at the exit of the first mixer 25.

The elements constituting the injection assembly 10 are regulated by the controller 100 in order to obtain a mixture containing the neutron-absorbing element that ensures neutron capture and effective cooling of the nuclear reactor core.

The injection assembly according to the invention has the advantage of being compact and having a weight and dimensions compatible with transportation by a land or maritime vehicle, or by helicopter.

This assembly can be stored remotely and rapidly transported to the plant site as needed.

The use of a coolant in powdered, rather than liquid, form allows for limiting weight, and this assembly is compatible with a saltwater or fresh water supply that avoid the step of dissolving the powder in buffer tarpaulins that are too cumbersome and require a mixing and heating device, as well as a transfilling device to transfer the water from one tarpaulin to the other.

The assembly according to the invention allows for direct dissolution of the neutron-absorbing element in the water, and the continuous injection of the mixture thus obtained at the required flow rate.

What is claimed is:

1. An assembly for injecting water containing a neutron-absorbing element in order to cool a nuclear reactor core of a nuclear reactor in a crisis situation, the assembly comprising:
a mobile structure, the mobile structure being configured to be transported to the nuclear reactor during the crisis situation, the mobile structure including a main pipe, the main pipe including a first end connectable to a water supply, the main pipe including a second end connectable to a circuit connected to a primary circuit of the nuclear reactor, the main pipe including, between the first and second ends, each of a pump, an injector and a first mixer;
the pump being configured to cause water received from the water supply to flow in the main pipe,
the injector being configured to continuously inject a neutron-absorbing element in powder form into the water in the main pipe,
the first mixer being configured to mix and dissolve the injected powder in the water,
the mobile structure including a controller, the controller being configured to control a flow rate of the water in the main pipe and an injection rate of the powder into the water by the injector.

2. The assembly as recited in claim 1 wherein the main pipe further includes, between the pump and the injector, a water heater regulated by the controller.

3. The assembly as recited in claim 1 wherein the mobile structure further includes a secondary pipe having a first end connectable to a water supply and a second end connectable to the main pipe between the first mixer and the second end of the main pipe, the secondary pipe including a pump between the first and second ends thereof.

4. The assembly as recited in claim 3 wherein the main pipe includes, between the second end of the secondary pipe and the second end of the main pipe, a second mixer configured for mixing the powdered neutron-absorbing element and the water in the secondary pipe.

5. The assembly as recited in claim 4 wherein the second mixer comprises a mechanical mixer.

6. The assembly as recited in claim 1 wherein the first mixer comprises a mechanical mixer and ultrasound inducers controlled by the controller.

7. The assembly as recited in claim 1 wherein the controller is configured to operate to control operation of the first mixer.

* * * * *